United States Patent [19]

Herzog et al.

[11] Patent Number: 4,937,948
[45] Date of Patent: Jul. 3, 1990

[54] PROBE HEAD FOR A COORDINATE-MEASURING INSTRUMENT

[75] Inventors: Klaus Herzog, Oberkochen; Franz Szenger, Konigsbronn, both of Fed. Rep. of Germany

[73] Assignee: Carl-Zeiss-Stiftung, Heidenheim/Brenz, Fed. Rep. of Germany

[21] Appl. No.: 225,178

[22] Filed: Jul. 28, 1988

[30] Foreign Application Priority Data

Jul. 30, 1987 [DE] Fed. Rep. of Germany ....... 3725207

[51] Int. Cl.⁵ .............................................. G01B 7/03
[52] U.S. Cl. ........................................ 33/559; 33/556; 33/561; 33/832
[58] Field of Search ................. 33/559, 558, 556, 561, 33/503, 832, 557, 572, 1 M

[56] References Cited

U.S. PATENT DOCUMENTS

| | | |
|---|---|---|
| 3,742,610 | 3/1973 | Calame .................................... 33/561 |
| 3,869,799 | 3/1975 | Neuer et al. ............................ 33/503 |
| 4,532,713 | 8/1985 | Feichtinger ............................ 33/559 |
| 4,621,434 | 11/1986 | Hirschmann ........................... 33/558 |
| 4,660,296 | 4/1987 | Klingler et al. ......................... 33/559 |

FOREIGN PATENT DOCUMENTS 2946271  5/1981  Fed. Rep. of Germany ........ 33/832

Primary Examiner—Allan N. Shoap
Assistant Examiner—Alvin Wirthlin
Attorney, Agent, or Firm—Hopgood, Calimafde, Kalil, Blaustein & Judlowe

[57] ABSTRACT

A probe head for coordinate-measuring instruments has a torsionally rigid, play-free and friction-free probe-suspension system which defines a three-dimensional coordinate system, wherein a probe pin is deflectable in all three directions in space. In order to be able to use the probe pin completely independent of its orientation, a separate taring device provides taring adjustment for each of the three coordinate axes in space. The taring device automatically sets the zero position of the suspension system in any orientation of the probe head, and for any change in orientation. In this connection, it is particularly advantageous to develop each taring device from two springs which are preloaded to act in opposition upon an element which is gravitationally deflected upon any change in probe-head orientation; to reach the zero position detected by an indicator, i.e., to effect the taring adjustment, provision is made for adjustment of the preload force of at least one of these springs.

13 Claims, 3 Drawing Sheets

PROBE HEAD FOR A COORDINATE-MEASURING INSTRUMENT

BACKGROUND OF THE INVENTION

The present invention relates to a probe head for a coordinate-measuring instrument wherein deflectable probe-mounting structure defines a three-dimensional coordinate system so that a work-contacting probe pin can be deflected in all of three coordinate directions in space.

The coordinate-measuring instrument serves to move the probe head in a three-dimensionally controlled manner until the pin of the probe contacts the object to be measured at a predetermined place, the space coordinates being fixedly established with high precision at the instant of contact with the workpiece (object). An associated computer determines desired measurements of the workpiece, from the space coordinates of different contact locations on the workpiece.

A large number of probe heads for coordinate-measuring instruments are known, but all of these are subject to the limitation that they can be used only in a given orientation in space.

Thus, West German Pat. No. 2,242,355 and its corresponding U.S. Pat. No. 3,869,799 disclose a probe head having a probe-mounting system which consists of a torsionally rigid sequence of play-free and friction-free linear suspensions, wherein each suspension accommodates deflection in a different one of the coordinate directions of a three-dimensional coordinate system. This probe head is used in a vertical orientation in space which corresponds to the z-axis. Provision is made for weight equalization in the z-direction, in order to relieve the suspended probe from gravitationally loaded contact with the workpiece. This equalization is effected via a spring which is arranged between that part of the probe head which is secured to the machine and the part of the suspension system which is adapted to receive the probe pin. The force of this spring is adjustable via a motor which effects z-axis displacement of the point of attachment of the spring to the machine until a zero indicator (within the z-axis suspension) becomes operative to stop the spring-displacement motor, i.e., when the zero position is reached.

This known probe head can be used only in a single orientation in space since it is only in the z-direction that the spring can provide the weightcounterbalancing adjustment which is necessary when making a change from one to another probe pin. As discussed in West German Pat. No. 2,242,355, it is desirable that numerous different probe pins be available for selective connection to the probe head; for a given mounted position of the workpiece, an adequate inventory of different replaceable probe pins and probe-pin configurations makes it possible to make work-contact measurements at workpiece locations which would otherwise be inaccessible for a single probe pin or probe-pin configuration.

Nevertheless, many measurement tasks can be handled only with great difficulty, if at all, with a probe head which can be inserted only in one orientation in space. These include, for example, the task of measuring in the inside of a workpiece when the surface to be contacted lies so far within the workpiece that it can be reached, if at all, only with a very long probe pin.

U.S. Pat. No. 4,364,179 describes a probe head which accepts probe-pin insertion in a horizontal orientation in space. In this case, the probe pin is secured to a cylindrical body which is mounted for horizontal displacement within the probe-head housing. This cylindrical body is suspended by a Hooke's joint via a bushing in an outer part of the housing in such manner that it can be articulated with limited universal action about two axes which are mutually perpendicular.

In this horizontally oriented case, taring of the probe head is effected manually by shifting weights on the cylindrical body so that rotational moments are equal on both sides of the horizontal rotary axis defined by the Hooke's joint. Such taring is effective only for a single axis, so that the probe pin can be inserted only in its horizontal orientation in space. Furthermore, such taring is cumbersome and cannot be automated, and it suffers from the disadvantage that the mass to be moved at workpiece contact is increased by the taring weights, thus detrimentally affecting the obtainable precision.

BRIEF STATEMENT OF THE INVENTION

It is the object of the present invention to provide a probe-head construction which establishes three-dimensionally deflectable suspension of an inserted probe pin, with gravitational compensation regardless of probe-head orientation in space.

This object is achieved by providing, for each of three orthogonal deflection axes of probe suspension, a taring device which automatically adjusts for the zero position of the deflection axis, for every possible orientation of the probe head.

Such a probe head has the advantage of enabling workpiece-measuring contact from any desired direction without changing the probe pin, thus making it possible to measure objects of any desired shape and, in particular also to make measurements within a workpiece cavity. In this connection, with suitable development and control of the coordinate-measuring system for positioning the probe head, the result can also be obtained that workpiece contact always occurs in the direction normal to the surface contacted, thus achieving high precision of measurement.

It is particularly advantageous that the taring device shall employ plural springs, at least one of which is of adjustable spring force. Such a development of the taring device makes possible a low-weight probe head, so that the precision of measurement is not detrimentally affected as compared with prior-art probe heads.

DETAILED DESCRIPTION

One embodiment of a three-dimensionally compensated probe head of the invention will be described in conjunction with the accompanying drawings, subject to the limitation that, for reasons of clarity and simplification, only the suspension systems of the probe head are shown; a more detailed showing and other features of the same probe-head embodiment are described in conjunction with FIGS. 1 to 4 of U.S. application Ser. No. 225,162 (now U.S. Pat. No. 4,882,848), filed on even date herewith. In said accompanying drawings:

FIG. 3 is a zero indicator such as used in the taring devices of FIGS. 1, 2 and 2a;

FIG. 4 is a schematic diagram of an electronic system for automatic control of taring, within the probe head of FIGS. 1, 2 and 2a.

Figure 1:
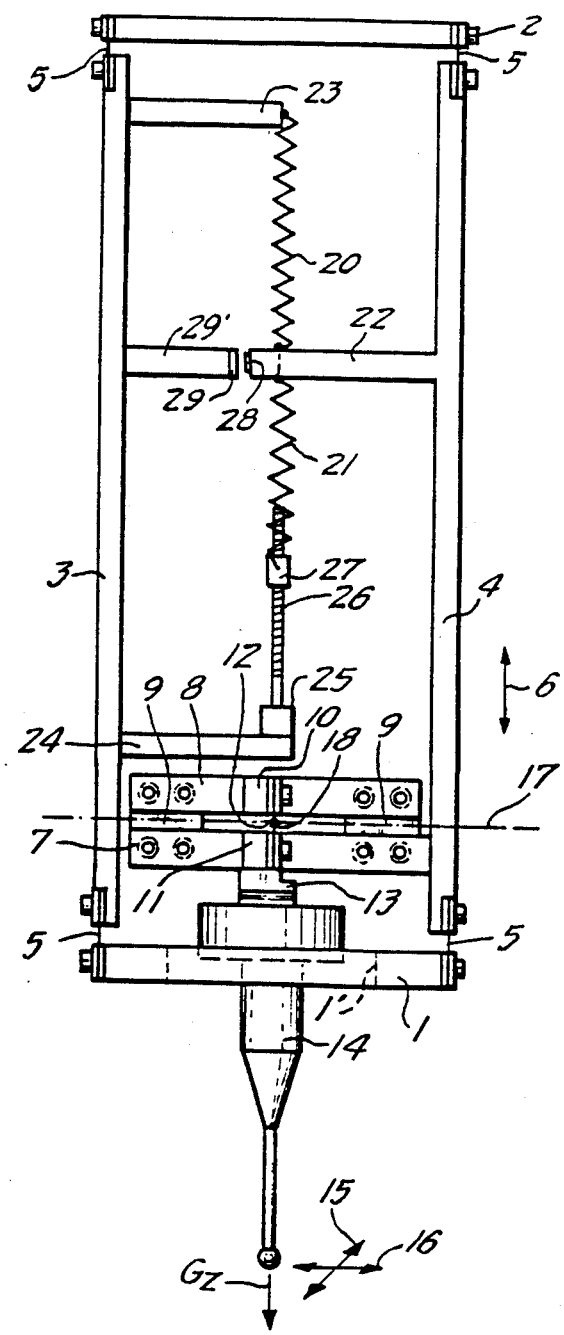
FIG. 1 is a simplified view in elevation of a probe head with a three-axis suspension system for a mounted probe pin, the view being such as to show only a first of three taring devices, said first taring device acting in the direction of the axis of the probe pin, and in the context of an existing gravity-force vector $G_Z$.
Figure 2:
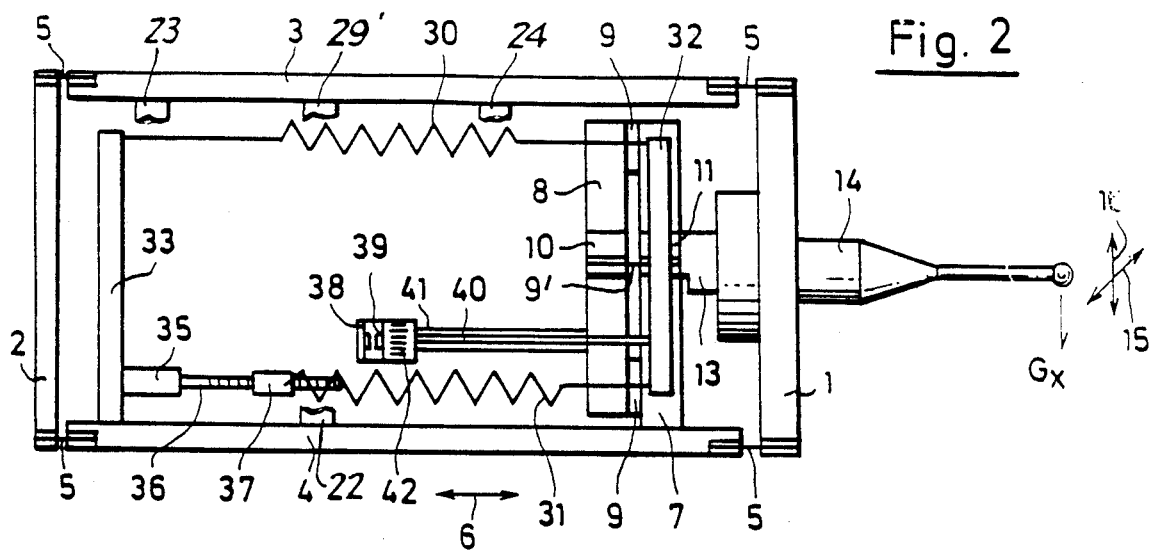
FIG. 2 is a similar view of the probe head of FIG. 1, the view being to show a 90° shift in orientation in relation to the orientation of FIG. 1, and such as to show only a second taring device, which acts perpendicular to the axis of the probe pin, and in the context of an existing gravity-force vector $G_X$.
Figure 2A:
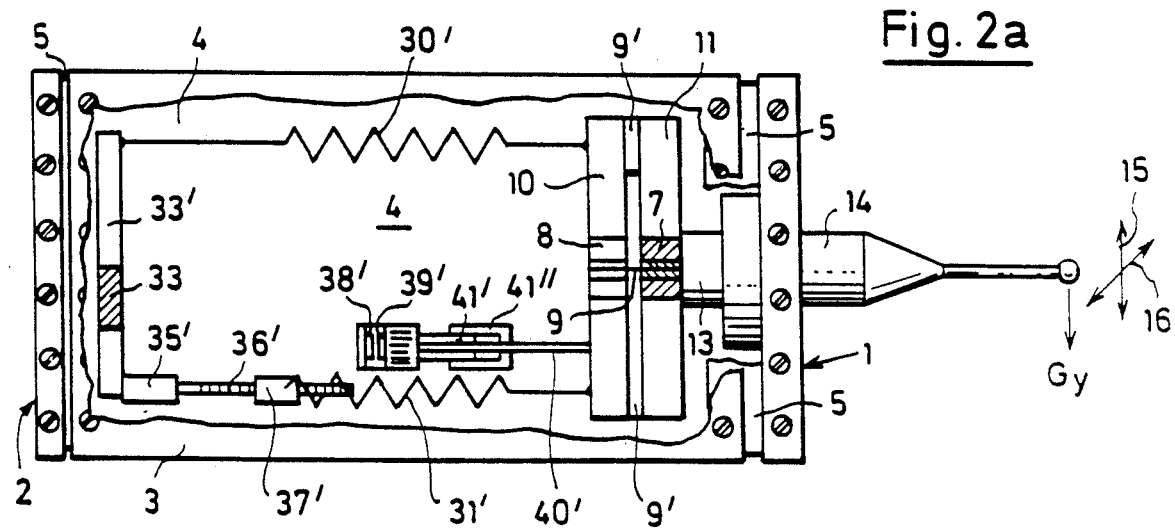
FIG. 2a is a view similar to FIG. 2, the view being to show a further 90° shift in orientation in relation to the respective orientations of FIGS. 1 and 2, and such as to show only a third taring device, which also acts perpendicular to the axis of the probe pin, but in the context of an existing gravity-force vector $G_Y$.

In the probe head of FIGS. 1, 2 and 2a, a torsionally rigid spring parallelogram establishes a suspension for the first of three orthogonally related degrees of displaceability of a mounted probe 14. This first suspension consists of side parts or panels 1 to 4 which are connected together by leaf springs 5, it being understood that instead of leaf springs 5, one can also provide crossed-spring joints (flexural pivots) which consist of two leaf springs arranged at a right angle to each other. The side part or panel 3 is a base that is adapted for rigid connection to a coordinate-measuring instrument while the side part 4 can be deflected in the direction indicated by arrow 6; arrow 6 thus identifies the first of three orthogonally related coordinate directions of deflection action in the probe-suspension system of FIGS. 1, 2 and 2a.

In the drawings, a showing of the coordinate-measuring instrument and, in particular, also of the means for holding and moving the probe head have been omitted, and the latter means will be understood to be developed in such manner that (1) the probe head can be moved into any desired orientation position in space and (2) that a work-contacting movement can be performed from any position in space. A suitable coordinate-measuring instrument is described by way of example in U.S. Pat. 4,175,327.

Figure 1A:
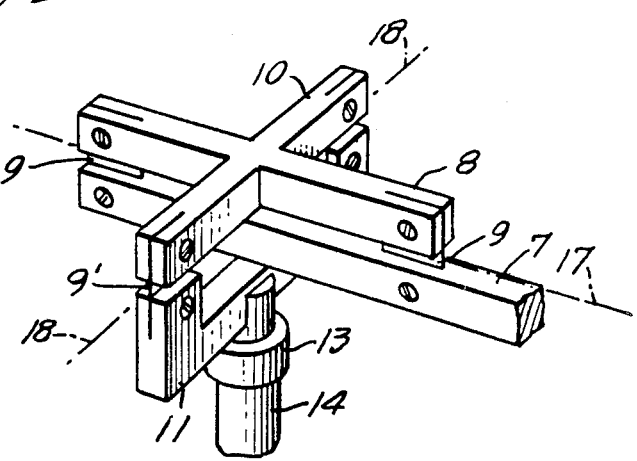
FIG. 1a is a simplified view in perspective to show provision for the second and third axes of the suspension system of FIG. 1.

The second and third coordinate directions of deflection action in the probe-suspension system of FIGS. 1, 2 and 2a are provided by the mutually perpendicular deflection axes of a so-called Hooke's joint (Kardangelenk). In this joint (see also FIG. 1a), a first bar member 7 is fixedly carried by the displaceable panel 4, and a second bar member 8 is connected by spaced leaf springs 9 to correspondingly spaced locations on bar member 7, with single-axis flexibility about a second axis 17 of pivotal deflection. A third bar member 10 is rigidly integrated with bar 8 to define a rigid cross of bars 8/10, the latter being orthogonally directed in a transverse plane that is normal to the deflection direction 6. Finally, a fourth bar member 11 has spaced leafspring connection 9' to the third bar member 10, being in the same general transverse plane of the first bar member 7 and with single-axis flexibility about a third axis 18 of pivotal deflection; to permit flexible action of the fourth bar member 11 about either or both of the orthogonal deflection axes 17/18 and with respect to the first bar member 7, it will be understood that at least one of the bar members 7/11 is suitably formed, as by a local recess, to provide sufficient clearance for at least some relative movement of members 7/11 about these axes, each of which accommodates probe deflections which are orthogonal to the deflection direction 6.

As a result of the described relationships, the fourth bar member 11 is deflectable in three mutually perpendicular component directions with respect to the base panel 3 of measuring-instrument mounting; and a measuring probe 14 with the same universal deflectability is shown mounted to a structural part 13 of the fourth bar member 11, (a) in axial alignment with the geometrical intersection point 12 of the flexible-hinge axes 17/18, (b) said axial alignment being parallel to the displacement direction 6, and (c) probe 14 extending, with clearance, through a circular cut-out 1' in panel 1. The resulting component directions of probe displaceability via the hinge axes 17/18 are diagrammatically represented by arrows 15/16, respectively.

Upon movement in the direction of arrow 15, the pin of probe 14 has limited freedom of pivoting displacement about axis 17 involving coaction of parts 7/8 via a first pair of leaf springs 9. And movement of the probe pin 14 in the direction of arrow 16 involves coaction of parts 10/11, via a second pair of leaf springs 9', for limited freedom of pivoting displacement about rotary axis 18, perpendicular to axis 17 and geometrically intersecting the same at 12.

If the pin of probe 14 is used in the vertical orientation shown in FIG. 1, then the gravitational weight force $G_z$ is operative to apply the force of this weight to the side panel 4 of the spring parallelogram, thus pulling the same downward in the direction of arrow 6 until limited by a stop (not shown); however, to neutralize the effect of this weight force $G_z$, a first taring device is provided.

This first taring device consists of springs 20 and 21 attached to an arm 22 which is rigidly connected to the displaceable side panel 4; and the other ends of springs 20 and 21 are connected to spaced support arms 23/24, which are rigidly connected to the instrument-mounting side panel 3 of the spring parallelogram.

The action of spring 21 is adjustable. For this purpose, a motor 25 is mounted to support 24 and, when actuated, reversibly drives a lead screw 26; and a nonrotating nut 27 engaged to the lead screw is in turn connected to spring 21. Upon actuation of motor 25, the lead nut 27, and hence the point of spring-21 attachment, can therefore be displaced with resulting adjustment of the force exerted by spring 21.

The spring parallelogram will be seen as a four-bar linkage (1 to 4), for which a zero position is established by means of a zero detector/indicator 28/29; part 28 of the detector indicator is shown mounted to arm 22, and part 29 of the detector indicator is shown mounted to an arm 29' fixed to base panel 3. As soon as this detector-/indicator supplies a signal indicative of the direction of deviation from the zero position, motor 25 is correspondingly actuated.

Taring of the probe head of FIG. 1 is effected, for the orientation shown in FIG. 1, by selecting a spring 20 which somewhat overcompensates for the weight force $G_z$, in order for zero indicator 28/29 to supply an output signal. This signal directionally actuates motor 25 to displace the lead nut 27 until the precise zero position is reached and detected by indicator 28/29. If the probe head is now swung 90° into a horizontal position (i.e., to the FIG. 2 orientation), then the gravitational weight force $G_z$ is no longer operative, but the operative gravitation weight force is $G_x$. To neutralize the taring for weight force $G_z$, spring 20 will pull arm 22 away from the zero position and in the direction toward arm 23. This movement and its direction are detected by the zero indicator 28/29, and a signal is produced to activate motor 25 for lead-screw drive of nut 27 in the direction toward the motor until the zero indicator 28/29 again detects the zero position, at which point the force of spring 21 corresponds approximately to the force of the spring 20, in that the z-component ($G_z$) of weight force is now zero.

If the probe head is turned an additional 90° so that the probe pin 14 now points upward, then the weight force $G_z$, acts in the arrow-6 direction which is opposite to that involved in the downwardly directed orientation of probe 14. As a result, arm 22 responds to gravity by moving in the direction toward arm 23, and the zero indicator 28/29 produces a signal that directionally calls for spring-force correction. This signal causes motor 25 to move nut 27 further in the direction toward motor 25 until the zero indicator 28/29 again detects the zero position.

As shown by this explanation, the adjustment range of spring 21 must lie approximately between zero and twice $G_z$. For all other probe orientations in space, the force of spring 21 is adjusted between these two limiting values, namely, in each case until the zero indicator 28/29 indicates the zero position for the z-axis orientation.

FIG. 2 is useful to show a second taring device for a taring of the probe head when horizontally oriented, with grativational weight force $G_x$ acting in the direction of arrow 16, i.e., when the weight force $G_x$ strives to downwardly displace probe 14, via leaf-spring flexing about axis 18, as bar member 11 tilts downward with respect to bar member 10. To compensate for downward tilting displacement attributable to the gravitational force $G_x$, the second taring device is shown to comprise a transverse arm 32, rigidly connected to the probesupporting bar member 11 and, therefore, subject to rotation about axis 18 for any pivoting operation of the leaf-spring connection between bar members 10, 11. Two springs 30 and 31 act with parallel forces on opposite ends of transverse arm 32, and the force of spring 31 is adjustable. The other points of attachment of springs 30 and 31 are referenced to an arm 33 which is rigidly connected to the displaceable panel 4 of the four-bar linkage (1 to 4). Arm 33 carries a motor 35 which, via a lead screw 36 and its engaged nut 37, displaces the one point of spring-31 attachment to arm 33.

Taring adjustments with respect to the weight force $G_x$ are effected by directionally controlled actuation of motor 35 in the manner described for force-$G_z$ neutralization in connection with FIG. 1.

For a sensing of the zero position of direction 16, a zero indicator 38/39 is arranged on the respective adjacent ends of support arms 40 and 41; in this connection, arm 40 is rigidly attached to transverse arm 32, while arm 41 is rigidly attached to the bar member 8 of the Hooke's joint. Upon a movement of the pin of probe 14 in the direction of the arrow 16, the sensing elements of the zero indicator 38/39 move with respect to each other to produce a directionally operative signal. Coacting measurement-grid indicia can be provided on the respective supports 40 and 41, only one of which grids, namely the grid 42, being shown in FIG. 2; these measurement grids will be understood to provide a basis for producing incremental-distance-measurement signals, for displacements in the direction 16, reference being made to copending U.S. patent application Ser. No. 932,283 (now U.S. Pat. No. 4,758,720) for discussion of measurement grids in an incremental-distance-measuring system.

It will be understood that the force of spring 31 must be adjustable approximately between the limits zero and twice $G_x$. In such case, the taring device of FIG. 2 will assure automatic adjustment of the probe head to zero position with respect to the spring joint which involves bar members 10, 11, for every orientation of the probe head.

The third taring device will be understood to compensate for Y-component gravitational-weight variations as a function of probe orientation, insofar as the variation applies in whole or in part to displacement in the direction 15, i.e., for leaf-spring pivoting flexure about axis 17, involving relative displacement of bar members 7, 8, all in the context of the gravitational-force vector $G_Y$. This third taring device (shown in FIG. 2a) is operative to automatically achieve the zero position of flexed tilting displacement of bar member 8 with respect to bar member 7 (fixed to panel 4). The third taring device thus includes components as described at 30, 31, 35, 36, 37, namely, springs 30', 31' attached to the opposite ends of bar member 10 and referenced to a cross arm 33' of arm 33 (fixed to panel 4), with reversible motor (35') drive of adjustable means (36', 37') for spring 31' And the respective coacting parts of the zero-position indicator (38', 39') of the third taring device are mounted by support arms 40', 41' that are respectively fixed to bar member 10 and (at 41") to panel 4. Since this third taring device is the same construction as the second taring device (described in connection with FIG. 2), further discussion for the third taring device, for direction 15, is not deemed necessary.

Figure 3:
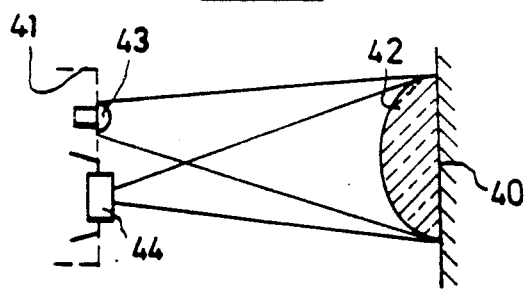

The zero indicator 38/39 of FIG. 2 (as well as the zero indicator 38'/39' of FIG. 2a) is as described in said application Ser. No. 932,283 (now U.S. Pat. No. 4,758,720) and utilizes the opto-electronic combination shown in FIG. 3, wherein it can be seen that the front end of support arm 40 carries a cylindrical lens 42 and the adjacent front end of arm 41 carries a light-emitting diode 43 and a differential diode 44. Light coming from the light-emitting diode 43 is imaged by the cylindrical lens 42 having a flat reflecting rear surface; lens 42 produces a focal line which lies only on the difference diode 44. This difference diode is so developed that it directionally senses in highly sensitive manner any displacement of the focal line from the zero position established by the diode itself.

Figure 4:
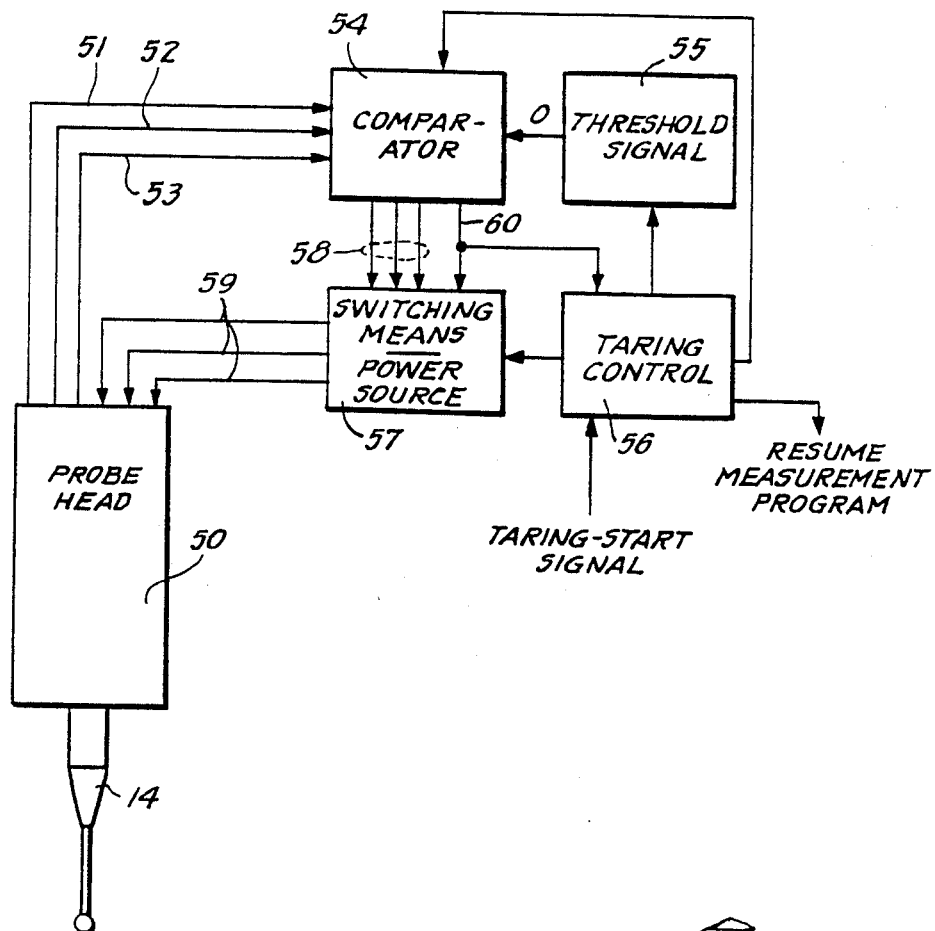

In the diagrammatic showing of FIG. 4, the probe head shown in FIGS. 1, 2 and 2a is indicated at 50. This probe head contains three zero indicators, one of which is shown in each of FIGS. 1, 2 and 2a. A simple method of taring will be explained, in the illustrative context of an automated program of multiple-coordinate measuring-instrument operation wherein orientation of the probe head is required for at least one measurement location on a given workpiece.

In the illustrative automated program, it will be assumed that for one or more initial measurements at different locations, the probe head 50 has had the same orientation, with probe 14 directed downward, as in the z-axis situation for which the probe head 10 of said West German Patent 2,242,355 has sole capability; this being the case, either the probe head 10 of said West German patent, or the z-axis use of the taring device described above in connection with FIG. 1, would be fully capable of making all of these one or more initial measurements. However, the next measurement in the assumed program calls for reorientation of probe head 50, into the horizontally oriented situation described above in connection with FIG. 2. The first event at the new location will be the reorientation of probe head 50, and such reorientation will be understood not only to generate a zero-indicator (38, 39) signal which calls for a taring correction of the newly introduced weight force $G_x$, but also to generate a zero-indicator (28, 29) signal which calls for a taring correction due to removal of the weight force $G_z$.

In FIG. 4, separate lines 51, 52, 53 convey the respective zero-indicator signals to a comparator 54, which is supplied with a "zero" reference signal, from a threshold-signal circuit 55. The computer of the coordinate-measuring instrument will have been operating pursuant to the assumed program which necessarily calls for reorientation of probe head 50, and a pick-off signal line from the computer to a taring-control circuit 56 is shown by legend to supply a taring-start signal to circuit 56, thus initiating operation of the comparator and threshold circuits 54, 55, as well as enabling switching and power delivery via lines 59 to such of the spring-adjusting motors within probe head 50 as may be needed.

Thus, for the assumed reorientation from vertical (FIG. 1) to horizontal (FIG. 2), each of the zero-indicator signal lines 51, 52 will carry its own directionally characterized signal to comparator 54, where the existence of each departure from "zero position" (and the direction of such departure) will be noted as a directionally characterized departure from the "zero" reference signal provided by circuit 55. The fact of noting such a departure at comparator 54 will be understood to immediately develop a first kind of output signal, in two of the three lines of cable connection 58 to the switching means at 57, whereby the respective motors 25, 35 are driven in the respective spring-adjusting directions to achieve "zero" positions for their associated deflection directions. Achievement of such "zero" positions is noted by comparator 54 and, "zero" positions are thus certified to have been achieved, comparator 54 supplies (via its other output connection 60 to circuits 56, 57) a shut-down of taring and related power-supply functions. A legend for the output of control circuit 56 indicates that, having completed the taring adjustments, the computer-operated measuring program can proceed, until again interrupted for further taring adjustments, should further reorientation of probe head 50 be involved, or should the probe 14 be replaced.

In addition to the described automated method of taring, it will be seen that it is also possible to form a control circuit from the zero-position indicator and the associated taring drive. The taring drive then displaces the spring of adjustable spring force until the zero-position indicator detects that requisite adjustment has been made.

The taring of the probe head must be activated after each change in probe-head orientation. In this connection, taring adjustments always proceed (1) in non-contacted condition, i.e., while the probe 14 is not contacting any workpiece or other object, and (2) with zero acceleration, i.e., when the probe head is in a condition of rest. And, while proceeding with each actual measurement, taring adjustments are disconnected via control circuit 56.

Figure 5:
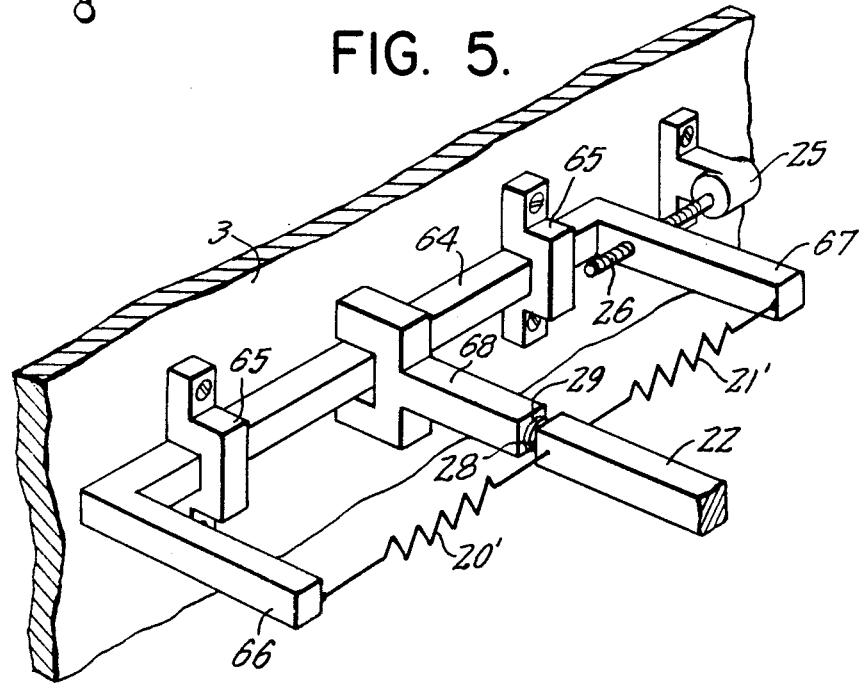
FIG. 5 is a simplified isometric view of a modification of part of the structure of FIG. 1.

While the invention has been described in detail for the embodiment shown in the drawing, wherein a single spring is adjusted for each direction of taring adjustment, it is also readily possible to develop the taring device such that both springs of the taring device are adjustable in their spring force, e.g., by increasing the tension of one spring while decreasing the tension of the other spring, thereby achieving a more rapid completion of each taring adjustment. Such an arrangement is shown in FIG. 5, illustratively as an alternative for the spring-compensating adjustment system 25, 26, 20, 21 of FIG. 1. In FIG. 5, the adjustment motor 25 and its lead screw 26 are operative to displace a U-shaped yoke 64 in the directional sense 6, as permitted by guides 65 mounted to panel 3 of the parallelogram suspension 1 to 4. Spaced arms 66/67 connect outer ends of springs 20'/21' to arm 22 which, it will be recalled, is fixedly carried by the displaceable panel 4 of the parallelogram suspension. The zero-position devices 28, 29 detect such displacement (in direction 6), relying on fixed mounting of device 29 to panel 3; as shown, the bifurcated end of arm 68 (which mounts device 29) straddles the guided part of the U-shaped yoke and is secured to panel 3.

What is claimed is:

1. A probe head for coordinate-measuring instruments having a probe-suspension system which defines a three-dimensional coordinate system and is adapted to carry a probe (14) which can be deflected in all three coordinate directions in space, characterized by the fact that, for each of the three coordinate directions (6, 15, 16), a separate taring device including an adjustable spring system is provided with means for automatically setting the zero position of the spring system, whereby the probe head is automatically adjusted for tare, whatever the spatial orientation of the probe head.

2. A probe head according to claim 1 wherein the probe head comprises three mutually perpendicular deflectable coordinate suspensions which define the three-dimensional coordinate system and wherein each taring device comprises two springs (20, 21; 30, 31) which are preloaded to act in opposition upon a first element (22, 32) which is displaceable out of its zero position in response to gravitationally induced deflection of the associated coordinate suspension (1 to 4; 10, 11); both springs (20, 21; 30, 31) being connected for preloading reference to a second element (23,33) which is independent of displacement responsive to said deflection; each taring device further comprising a zero-position indicator (28, 29; 38, 39) responsive to a deflection of the said coordinate system to produce a signal which characterizes the existence and the direction of deflection, and a reversible motor (25, 35) connected for control by said signal and operative to change the preloading force of at least one of said springs (21, 31), in the direction to reduce to zero the signal from said zero-position indicator.

3. A probe head according to claim 1, wherein both springs of the taring device are adjustable with respect to their spring force.

4. A probe head according to claim 3, wherein a longitudinally guided elongate yoke provides two longitudinally spaced connections (66, 67) to outer ends of both springs (20', 21'), said motor being connected to reversibly drive said yoke to change the preloading force of each of said springs in the direction to reduce to zero the signal from said zero-position indicator.

5. A probe head according to claim 2, characterized by the fact that the device for adjusting the spring force consists in each case of a motor (25, 35) for driving a lead screw (26, 36), the motor being mounted to the second element (23, 33) of the taring device, said lead screw having threaded engagement to a lead nut (27, 37) adjustably controlling the preloading of said one spring (21, 31).

6. A probe head according to claim 2, characterized by the fact that the zero-position indicator is part of a displacement-measuring system for producing incremental signals.

7. A probe head according to claim 2, wherein the zero-position indicator includes an optoelectronic reading system (42, 43, 44).

8. A probe head according to claim 1, wherein said suspension system comprises a four-bar linkage (1 to 4) of parallelogram configuration defining a first deflectable coordinate suspension and a Hooke's joint having two crossed-spring joints (7, 8, 9 and 9, 10, 11) which respectively define second and third deflectable coordinate suspensions, said second coordinate suspension being fixedly referenced to one of the bars of said linkage, means for mounting said head in fixed relation to another of the bars of said linkage, and means for mounting a probe to the third deflectable coordinate suspension.

9. In a probe head having a base for mounting to a multiple-coordinate measuring instrument, wherein the probe head mounts a probe-suspension system that is adapted to carry a deflectable probe, said system comprising three orthogonally related deflection systems each of which is independently deflectable in a different one of three coordinate directions, the improvement wherein, for each deflection system, a separate taring device including an adjustable spring system is provided with means for automatically setting the zero position of the involved deflection system, whereby the probe head is automatically adjusted for tare in each of the three coordinate directions, whatever the spatial orientation of the probe head.

10. A probe head having a base for mounting to a multiple-coordinate measuring instrument, a probe-suspension system adapted to carry a deflectable probe, said system comprising a four-bar linkage of parallelogram configuration wherein one of the links is fixedly related to said base so as to define a first of three probe-deflectable components, said system further comprising a Hooke's joint having two crossed-spring joints which respectively define second and third suspensions which independently deflect about mutually perpendicular pivot axes which are orthogonal to the direction of parallelogram deflectability, first taring means including a first adjustable spring system dedicated to taring for gravitational deflection of the parallelogram linkage, second taring means comprising a first linkage bar dedicated to tracking and controlling gravitationally derived Hooke's-joint rotation about one of its pivot axes, third taring means comprising a second linkage bar dedicated to tracking means and controlling gravitationally-derived Hooke's-joint rotation about the other of said pivot axes, said second taring means including a second adjustable spring system operative on said first linkage bar, and said third taring means including a third adjustable spring system operative on said second linkage bar.

11. In a probe head having a base for mounting to a multiple-coordinate measuring instrument, a first coordinate suspension system comprising a four-bar linkage of parallelogram configuration wherein one of the linked bars is fixedly related to said base, whereby the bar opposite said one bar is deflectable in a first coordinate direction with respect to said base, and a Hooke's joint comprising first and second bar members hingedly connected for pivotal deflection action about a first single axis, said first bar member being so mounted to said opposite bar of said linkage that said first single axis is orthogonal to said first coordinate direction, said joint comprising third and fourth bar members hingedly connected for pivotal deflection action about a second single axis, said third bar member being so fixedly related to said second bar member that said second single axis is orthogonal to said first single axis and to said first coordinate direction, and probe-mounting means on said fourth bar member, whereby pivotal action about said first single axis and about said second single axis respectively respond to mounted-probe deflection in second and third coordinate directions, first taring means including a first adjustable spring system dedicated to taring for gravitational deflection of the parallelogram linkage, second taring means including a second adjustable spring system dedicated to taring for gravitationally derived Hooke's-joint pivotal deflection about said first single axis, and third taring means including a third adjustable spring system dedicated to taring for gravitationally derived Hooke's-joint pivotal deflection about said second single axis.

12. The probe head of claim 11, in which said first and second single axes intersect, and in which said probe-mounting means has an axis of probe-mounting symmetry which is aligned with the intersection of said first and second single axes and extends normal to the plane defined by said first and second single axes.

13. The probe head of claim 11, in which said first taring means includes means for automatically setting the zero position of said four-bar linkage, in which said second taring means includes means for automatically setting the zero position of first single-axis pivotal displacement, and in which said third taring means includes means for automatically setting the zero position of second single-axis pivotal displacement.

* * * * *